United States Patent
Keilers (10) Patent No.: US 11,500,402 B2
(45) Date of Patent: Nov. 15, 2022

(54) POWER-AVAILABILITY-BASED POWER DELIVERY CONFIGURATION SYSTEM

(71) Applicant: Dell Products L.P., Round Rock, TX (US)

(72) Inventor: Cyril Adair Keilers, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 289 days.

(21) Appl. No.: 16/946,068

(22) Filed: Jun. 4, 2020

(65) Prior Publication Data

US 2021/0382507 A1  Dec. 9, 2021

(51) Int. Cl.
*G06F 1/26* (2006.01)
*G05F 1/46* (2006.01)
*G06F 15/78* (2006.01)

(52) U.S. Cl.
CPC .................. *G05F 1/46* (2013.01); *G06F 1/26* (2013.01); *G06F 15/7882* (2013.01)

(58) Field of Classification Search
CPC ........... G05F 1/46; G06F 1/26; G06F 15/7882
See application file for complete search history.

(56) References Cited

U.S. PATENT DOCUMENTS

| | | | |
|---|---|---|---|
| 6,775,784 B1 * | 8/2004 | Park ...................... | G06F 1/3203 713/323 |
| 9,640,992 B1 * | 5/2017 | Nay .......................... | H02J 1/14 |
| 2019/0187766 A1 * | 6/2019 | Hirosawa ................ | G06F 1/324 |

* cited by examiner

*Primary Examiner* — Zahid Choudhury
(74) *Attorney, Agent, or Firm* — Joseph Mencher (57) ABSTRACT

A power-availability-based power delivery configuration system includes a power scaling system that is coupled to a device and a power system. The power scaling system includes an adjustable power scaling circuit that is configured to convert power received from the power system from a first power level to a second power level. A power scaling controller is coupled to the device, the power system, and the power scaling circuit. The power scaling controller identifies a power amount available from the power system and, based on the power amount available from the power system, determines power delivery settings for the adjustable power scaling circuit and configures the adjustable power scaling circuit using the power delivery settings. The power scaling controller may also determine device settings for the device based on the power amount available from the power system and configure the device using the device settings.

20 Claims, 9 Drawing Sheets

POWER-AVAILABILITY-BASED POWER DELIVERY CONFIGURATION SYSTEM

BACKGROUND

The present disclosure relates generally to information handling systems, and more particularly to configuring power delivery in information handling systems based on available power.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, desktop computing devices, laptop/notebook computing devices, server computing devices, and/or other computing devices known in the art, are coupled to power sources that provide power to those computing devices. For example, Alternating Current/Direct Current (AC/DC) power systems such as power adapters, Power Supply Units (PSUs), and/or other AC/DC power systems known in the art may be utilized to couple a computing device to a wall outlet power source, with the AC/DC power system receiving Alternating Current (AC) power at a first power level (e.g., 110-240 volts from the wall outlet power source), and converting to Direct Current (DC) power at a second power level (e.g., 15-20 volts) that it provides to the computing device. However, AC/DC power systems are "rated" or otherwise designed to provide particular amounts of power (e.g., 50 watts, 100 watts, etc.), which can raise some issues.

For example, computing devices typically include a circuit board that connects to the AC/DC power system and that includes analog power scaling circuit(s) that are configured to convert the DC power that is received from the AC/DC power system at the second power level (e.g., 15-20 volts) to DC power at a third power level (e.g., 1.2 volts) for use by a processing system and/or other devices on the circuit board. In conventional computing devices, the circuit board and its analog power scaling circuit(s) are designed based on the rated amount of power of the AC/DC power system that will be used with those computing devices. However, users may connect different AC/DC power system with different capabilities to their computing devices during its lifetime, including AC/DC power systems with a power rating for which the circuit board and its analog power scaling circuit(s) were not designed. In situations in which the AC/DC power system connected to the computing device is rated for an amount of power that is greater than the power amount that the circuit board and its analog power scaling circuit(s) are designed for, any additional power that is over the power the circuit board and its analog power scaling circuit(s) are designed for will not be used by the computing device, resulting in inefficient use of that AC/DC power system. In situations in which the AC/DC power system connected to the computing device is rated for an amount of power that is less than the power amount that the circuit board and its analog power scaling circuit(s) are designed for, the circuit board and its analog power scaling circuit(s) may draw too much power from that AC/DC power system, resulting in an unstable computing device that may shut down due to lack of power.

Some computing devices attempt to address the possibility of being connected to different AC/DC power systems rated for different amounts of power by designing their circuit board and its analog power scaling circuit(s) for two different rated power amounts. For example, the circuit board and its analog power scaling circuit(s) in a computing device may be designed for use with both a AC/DC power system rated for 50 watts of power, and a AC/DC power system rating for 100 watts of power. However, such solutions are still limited to operating properly with particular AC/DC power systems, and the use of an AC/DC power system that does not include the particular power rating for which the circuit board and its analog power scaling circuit(s) were designed (e.g., 75 watts)) will still produce the issues discussed above.

Accordingly, it would be desirable to provide power-availability-based power delivery configuration system that addresses the issues discussed above.

SUMMARY

According to one embodiment, an Information Handling System (IHS) includes a controller processing system; and a controller memory system that is coupled to the controller processing system and that includes instructions that, when executed by the controller processing system, cause the controller processing system to provide a power scaling controller engine that is configured to: identify a power amount available from a power system; determine, based on the power amount available from the power system, power delivery settings for an adjustable power scaling circuit that is coupled to the power system and a device, and that is configured to convert power received from the power system from a first power level to a second power level; and configure, using the power delivery settings, the adjustable power scaling circuit.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
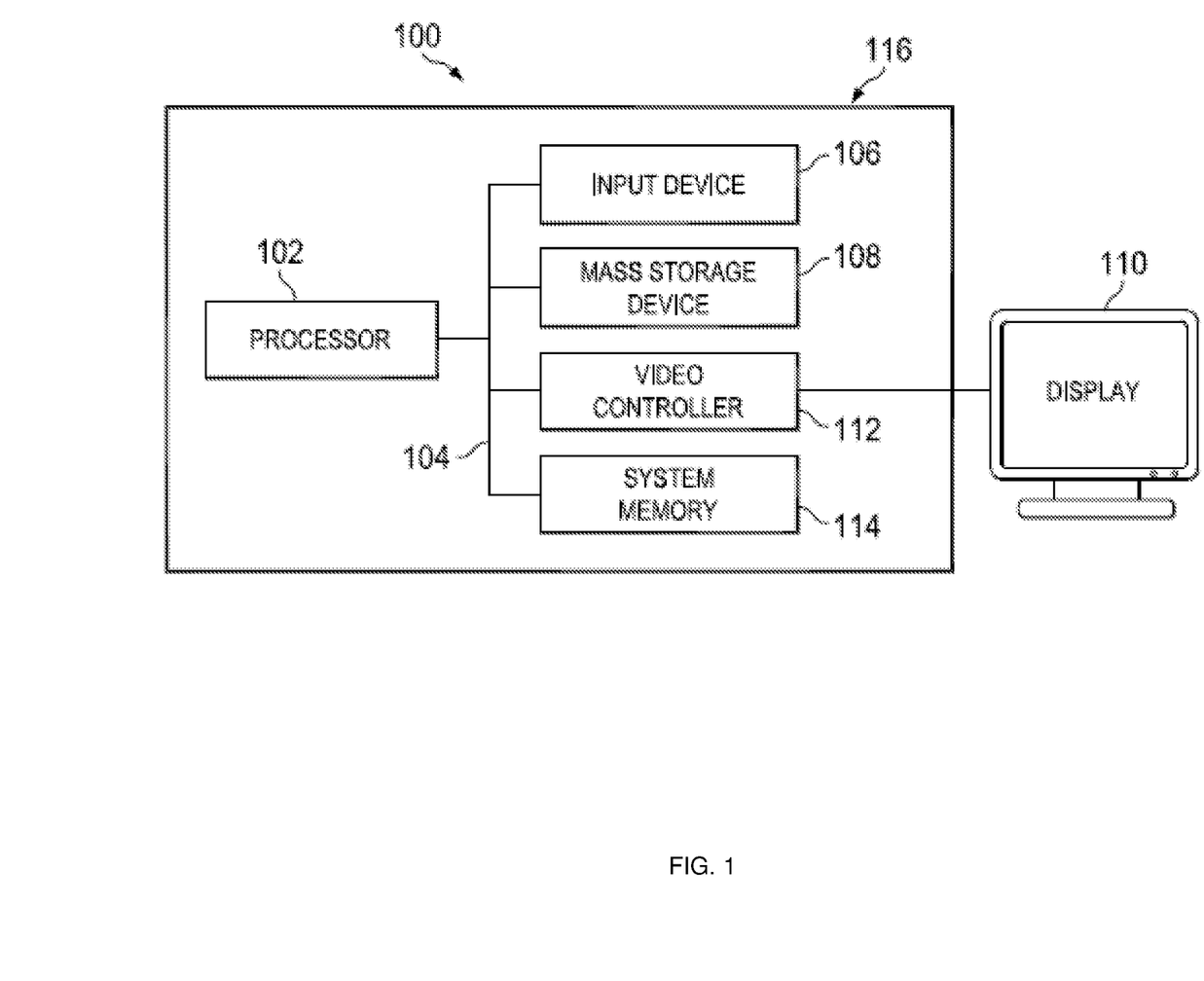
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
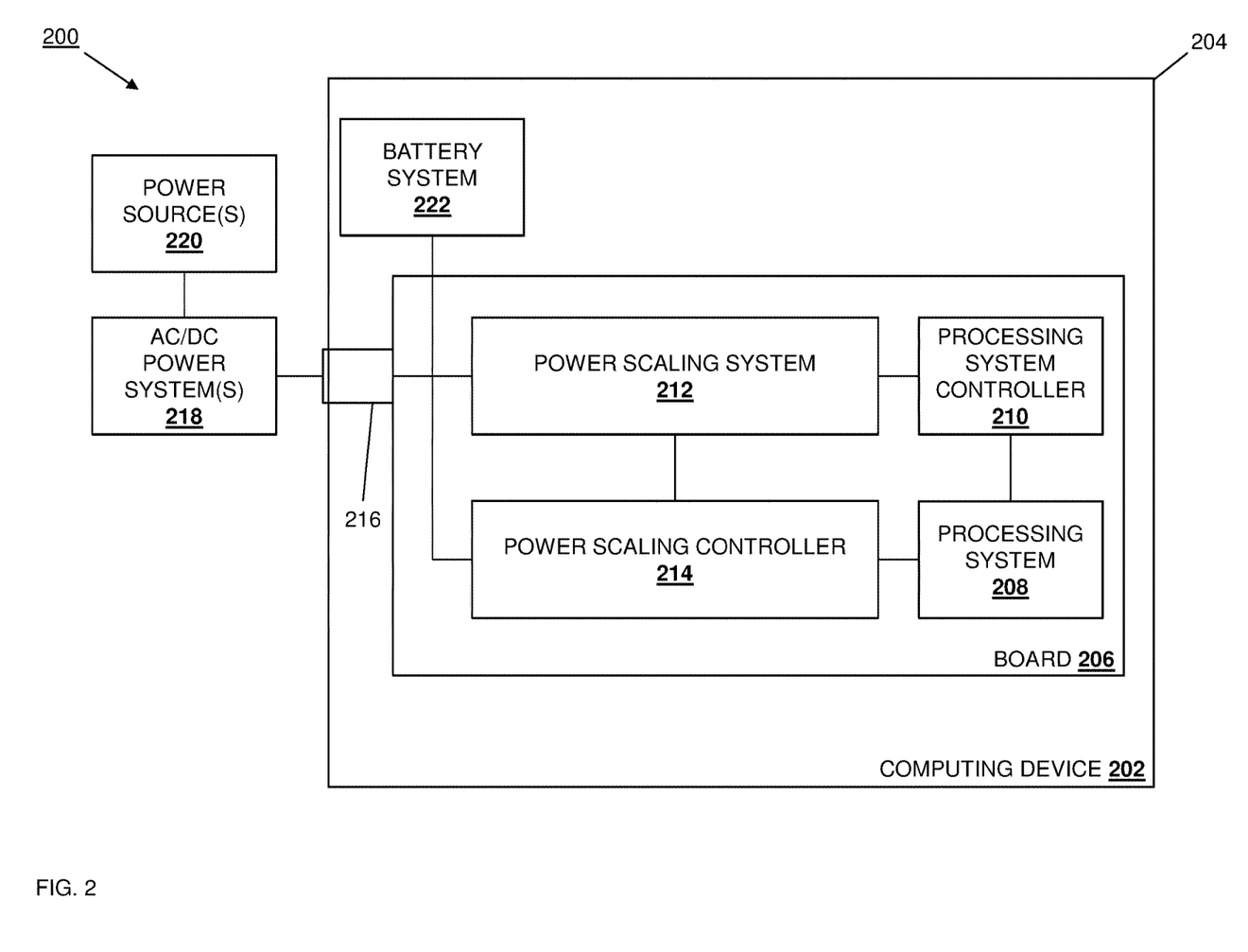
FIG. 2 is a schematic view illustrating an embodiment of a power-availability-based power delivery configuration system.

Referring now to FIG. 2, an embodiment of a power-availability-based power delivery configuration system 200 is illustrated. In the illustrated embodiment, the power-availability-based power delivery configuration system 200 include a computing device 202 that may be provided by the IHS 100 discussed above with reference to FIG. 1, and/or may include some or all of the components of the IHS 100, and in specific examples may be provided by a server computing device, a desktop computing device, a laptop/notebook computing device, and/or any other computing device that would be apparent to one of skill in the art in possession of the present disclosure. However, while illustrated and discussed as being provided by particular computing devices, one of skill in the art in possession of the present disclosure will recognize that the power-availability-based power delivery configuration system of the present disclosure may be provided in any device that is configured to operate similarly as the computing device 202 discussed below.

In the illustrated embodiment, the computing device 202 includes a chassis 204 that houses the components of the computing device 202, only some of which are illustrated below. For example, the chassis 204 may house a board 206 such as, for example a motherboard and/or other circuit boards that would be apparent to one of skill in the art in possession of the present disclosure. Furthermore, as illustrated, a processing system 208 may be mounted to the board 206, and may include Central Processing Units (CPUs), Graphics Processing Units (GPUs), and/or other processing systems known in the art. However, while the power-availability-based power delivery configuration system 200 is described herein as operating to configure the delivery of power to a processing system, one of skill in the art in possession of the present disclosure will appreciate that the power-availability-based power delivery configuration system of the present disclosure may be used to provide power to any of a variety of power-consuming devices while remaining within the scope of the present disclosure as well.

In the illustrated embodiment, a processing system controller 210 is also included on the board 206 and coupled to the processing system 208 (e.g., via a trace on the board 206). For example, the processing system controller 210 may be provided by an Intel Mobile Voltage Positioning 8 (IMVP8®)-compliant CPU power controller, although one of skill in the art in possession of the present disclosure will recognize that other controllers may fall within the scope of the present disclosure as well. While not explicitly illustrated in FIG. 2, one of skill in the art in possession of the present disclosure will appreciate that the processing system controller 210 may be coupled to processing system voltage regulators that are included in the processing system 206 as well.

In the illustrated embodiment, a power scaling system 212 is also included on the board 206 and coupled to the processing system controller 210 (e.g., via a trace on the board 206). As discussed in future detail below, the power scaling system 212 may include a variety of components for converting power from a first power level to a second power level, with the power at the second power level provided to the processing system 208 via the processing system controller 210. In the illustrated embodiment, a power scaling controller 214 is also included on the board 206 and coupled to the power scaling system 212 and the processing system 208 (e.g., via traces on the board 206). In a specific example, the coupling between the power scaling controller 214 and the power scaling system 212 may be provide by an Inter-Integrated Circuit (I²C) interface, although other interfaces will fall within the scope of the present disclosure as well. In some embodiments, the power scaling controller 214 may be provided by an Embedded Controller (EC) that is configured to perform the power scaling functionality discussed below while the computing device 202 is in a runtime environment. In other embodiments, the power scaling controller 214 may be provided by a Basic Input/Output System (BIOS) that is configured to perform the power scaling functionality discussed below while the computing device 202 is in an initialization environment. However, while a few specific examples of the power scaling controller are illustrated and described, one of skill in the art in possession of the present disclosure will recognize that the power scaling functionality of the power-availability-based power delivery configuration system 200 may be provided in a variety of manners that will fall within the scope of the present disclosure as well.

In the illustrated embodiment, the board 206 also include one or more power system connectors 216 that are accessible on the outside surface of the chassis 204, and that are coupled to each of the power scaling system 212 and the power scaling controller 214 (e.g., via traces on the board 206). As illustrated, one or more Alternating Current/Direct Current (AC/DC) power systems 218 may couple the one or more power system connector(s) 216 to one or more power sources 220. For example, one of skill in the art in possession of the present disclosure will recognize that the AC/DC power system(s) 218 illustrated in FIG. 2 may be provided by an AC/DC power adapter device that connects to the power source(s) 220 and the power system connector(s) 216. However, one of skill in the art in possession of the present disclosure will recognize that, in other examples, the AC/DC power system(s) 218 illustrated in FIG. 2 may be provided by an AC/DC Power Supply Unit (PSU) that may be housed in the chassis 204 and connected to an internal power system connector as well as to the power source(s) 220. As such, one of skill in the art in possession of the present disclosure will recognize that the power system utilized by the power-availability-based power delivery configuration system 200 may be provided in a variety of manners that will fall within the scope of the present disclosure as well.

In the illustrated embodiment, the chassis 204 also houses a battery system 222 that is coupled to the power scaling system 212, the power scaling controller 214, and the power system connector(s) 216 (e.g., via cabling, connectors, traces on the board 206, etc.), and that may include any of a variety of battery components that would be apparent to one of skill in the art in possession of the present disclosure. As will be appreciated by one of skill in the art in possession of the present disclosure, the battery system 222 may be configured to provide DC power to components in the computing device 202. However, while a specific power-availability-based power delivery configuration system 200 has been illustrated, one of skill in the art in possession of the present disclosure will recognize that the power-availability-based power delivery configuration functionality of the present disclosure may be performed using a variety of components and/or component configurations while remaining within the scope of the present disclosure as well.

Figure 3:
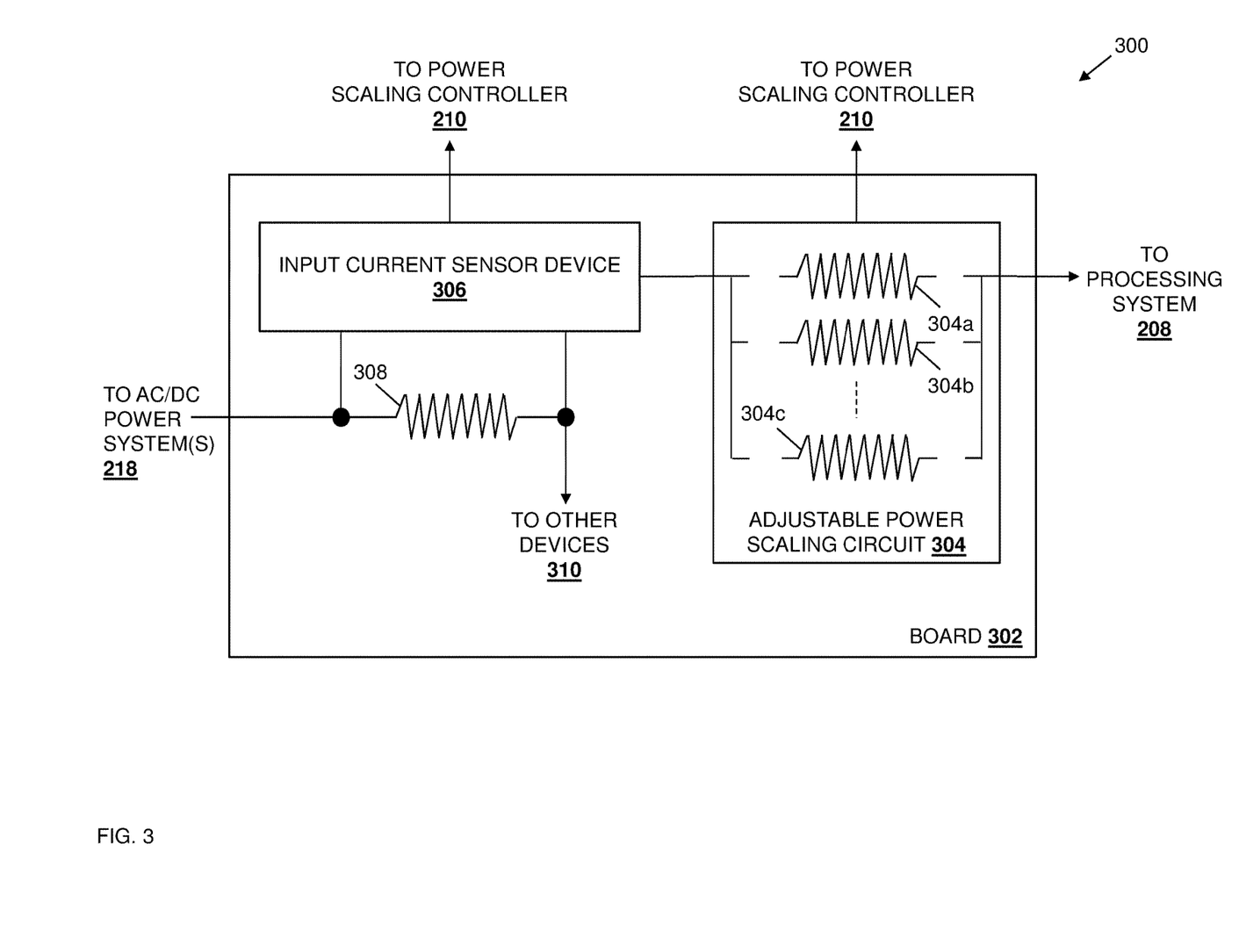
FIG. 3 is a schematic view illustrating an embodiment of a power scaling system that may be provided in the power-availability-based power delivery configuration system of FIG. 2.

Referring now to FIG. 3, an embodiment of a power scaling system 300 is illustrated that may provide the power scaling system 212 discussed above with reference to FIG. 2. The power scaling system 300 includes a board 302 that one of skill in the art in possession of the present disclosure will recognize may be provided by a portion of the board 206 discussed above with reference to FIG. 2. In the example provided in FIG. 3, the board 302 includes an adjustable power scaling circuit 304 that may be provided by a digitally adjustable analog power scaling circuit. In the examples below, the adjustable power scaling circuit 304 is provided by an adjustable digital resistor device that is illustrated conceptually in FIG. 3 by a plurality of resistor elements 304a, 304b, and up to 304c that, as discussed below, may be "activated" in order to change the resistance of the adjustable digital resistor device. However, while a specific example of the adjustable power scaling circuit 304 is illustrated and described as being provided by a specific adjustable digital resistor device, one of skill in the art will recognize how other configurable resistor systems and/or other circuit types may be utilized to provide the adjustable power scaling functionality of the adjustable power scaling circuit 304 described below. As illustrated, the adjustable power scaling circuit 304 is coupled to the processing system 208 (e.g., via the processing system controller 210) in a manner that allows the adjustable power scaling circuit 304 to provide converted power to the processing system 208 as discussed below, and is coupled to the power scaling controller 210 in a manner that allows the power scaling controller 210 to adjust the adjustable power scaling circuit 304 (e.g., by activating the resistor elements 304a-304c in the adjustable digital resistor device as described herein.)

In the illustrated embodiment, the board 302 also include an input current sensor device 306 that is coupled to the adjustable power scaling circuit 304 in a manner that allows the input current sensor device 306 to transmit power to the adjustable scaling circuit 304, and is coupled the power scaling controller 210 in a manner that allows the power scaling controller to identify characteristics of the power provided via the input current sensor device 306 to the adjustable scaling circuit 304. The board 302 also includes a resistor 308 that is coupled to the AC/DC power system(s) 218 in a manner that allows the resistor 308 to receive power from the AC/DC power system(s) 218, and is coupled in parallel to the input current sensor device 306 in manner that allows the input current sensor device 306 to identify a current provided by the AC/DC power system(s) 218 (i.e., across the resistor 308). Finally, as illustrated in FIG. 3, the resistor 308 may also be coupled to other devices 310 in a manner that provides the power received from the AC/DC power system(s) 218 to those devices 310. However, while a specific power scaling system 300 has been illustrated, one of skill in the art in possession of the present disclosure will recognize that the adjustable power scaling functionality of the present disclosure may be performed using a variety of components and/or component configurations while remaining within the scope of the present disclosure as well Referring now to FIG. 4, an embodiment of a power scaling controller 400 is illustrated that may provide the power scaling controller 214 discussed above with reference to FIG. 2. As such, the power scaling controller 400 may be provided by the IHS 100 discussed above with reference to FIG. 1 and/or may include some or all of the components of the IHS 100, and in specific examples, may be provided by an EC, a BIOS, and/or other controller systems that would be apparent to one of skill in the art in possession of the present disclosure. Furthermore, while illustrated and discussed as being provided by particular controllers included on a motherboard, one of skill in the art in possession of the present disclosure will recognize that the functionality of the power scaling controller 400 discussed below may be provided by other devices and in other manners (e.g., by a DELL® integrated Remote Access Controller (iDRAC®) available from DELL® Inc. of Round Rock, Tex., United States) that are configured to operate similarly as the power scaling controller 400 discussed below. In the illustrated embodiment, the power scaling controller 400 includes a chassis 402 (e.g., a circuit board) that includes the components of the power scaling controller 400, only some of which are illustrated below. For example, the chassis 402 may include a controller processing system (not illustrated, but which may include the processor 102 discussed above with reference to FIG. 1) and a controller memory system (not illustrated, but which may include the memory 114 discussed above with reference to FIG. 1) that is coupled to the controller processing system and that includes instructions that, when executed by the controller processing system, cause the controller processing system to provide a power scaling controller engine 304 that is configured to perform the functionality of the power scaling controller engine and/or power scaling controllers discussed below.

Figure 4:
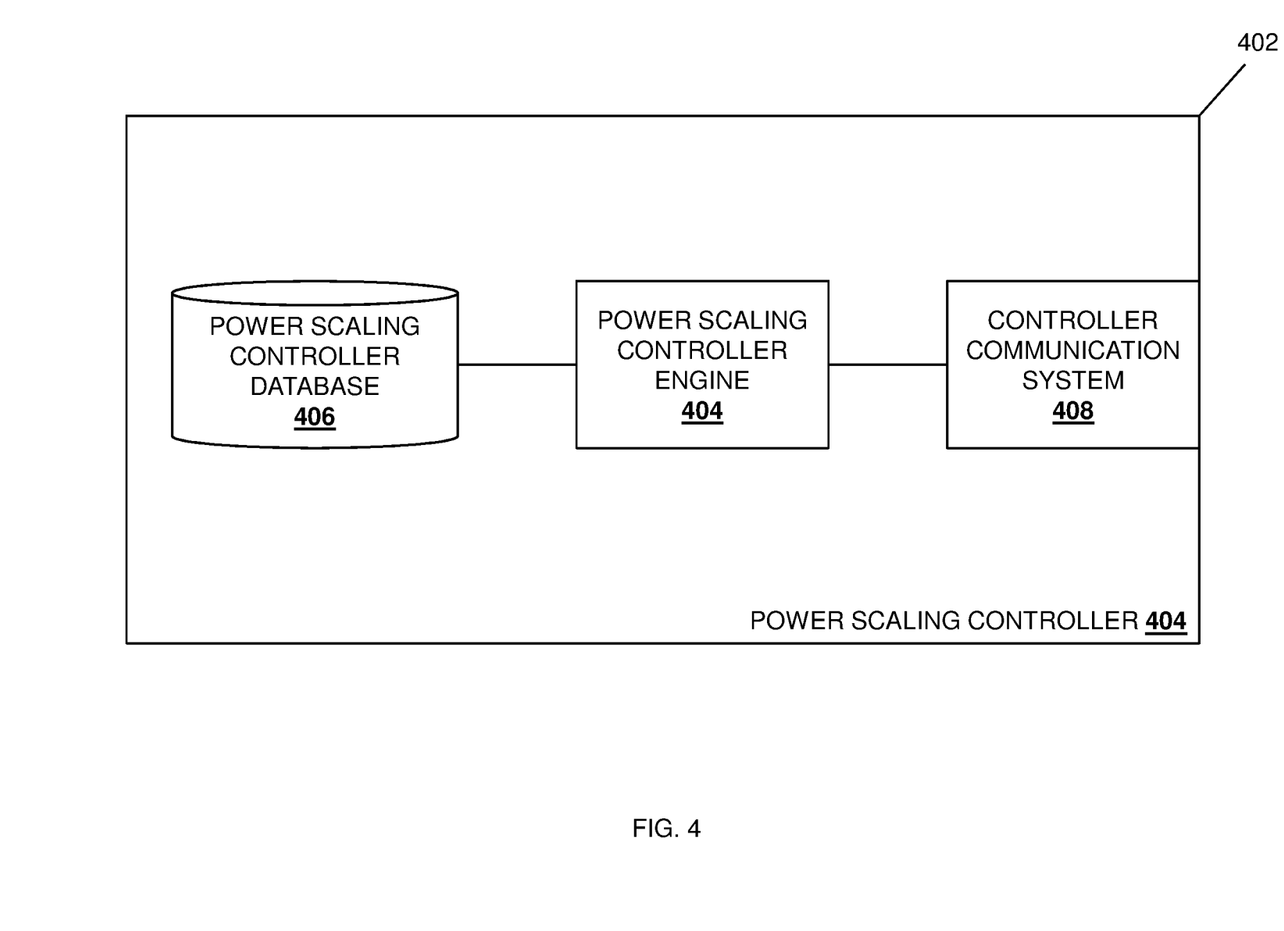
FIG. 4 is a schematic view illustrating an embodiment of a power scaling controller that may be provided in the power-availability-based power delivery configuration system of FIG. 2.

The chassis 402 may also include a controller storage system (not illustrated, but which may include the storage 108 discussed above with reference to FIG. 1) that is coupled to the power scaling controller engine 404 (e.g., via a coupling between the controller storage system and the controller processing system) and that includes a power scaling controller database 406 that is configured to store any of the information utilized by the power scaling controller engine 404 discussed below. The chassis 402 may also include a controller communication system 408 that is coupled to the power scaling controller engine 404 (e.g., via a coupling between the controller communication system 408 and the controller processing system) and that may be provided by connectors, cabling, traces, and/or any other communication components that would be apparent to one of skill in the art in possession of the present disclosure. However, while a specific power scaling controller 400 has been illustrated, one of skill in the art in possession of the present disclosure will recognize that power scaling controllers (or other devices operating according to the teachings of the present disclosure in a manner similar to that described below for the power scaling controller 400) may include a variety of components and/or component configurations for providing conventional power controller functionality, as well as the functionality discussed below, while remaining within the scope of the present disclosure as well.

Figure 5:
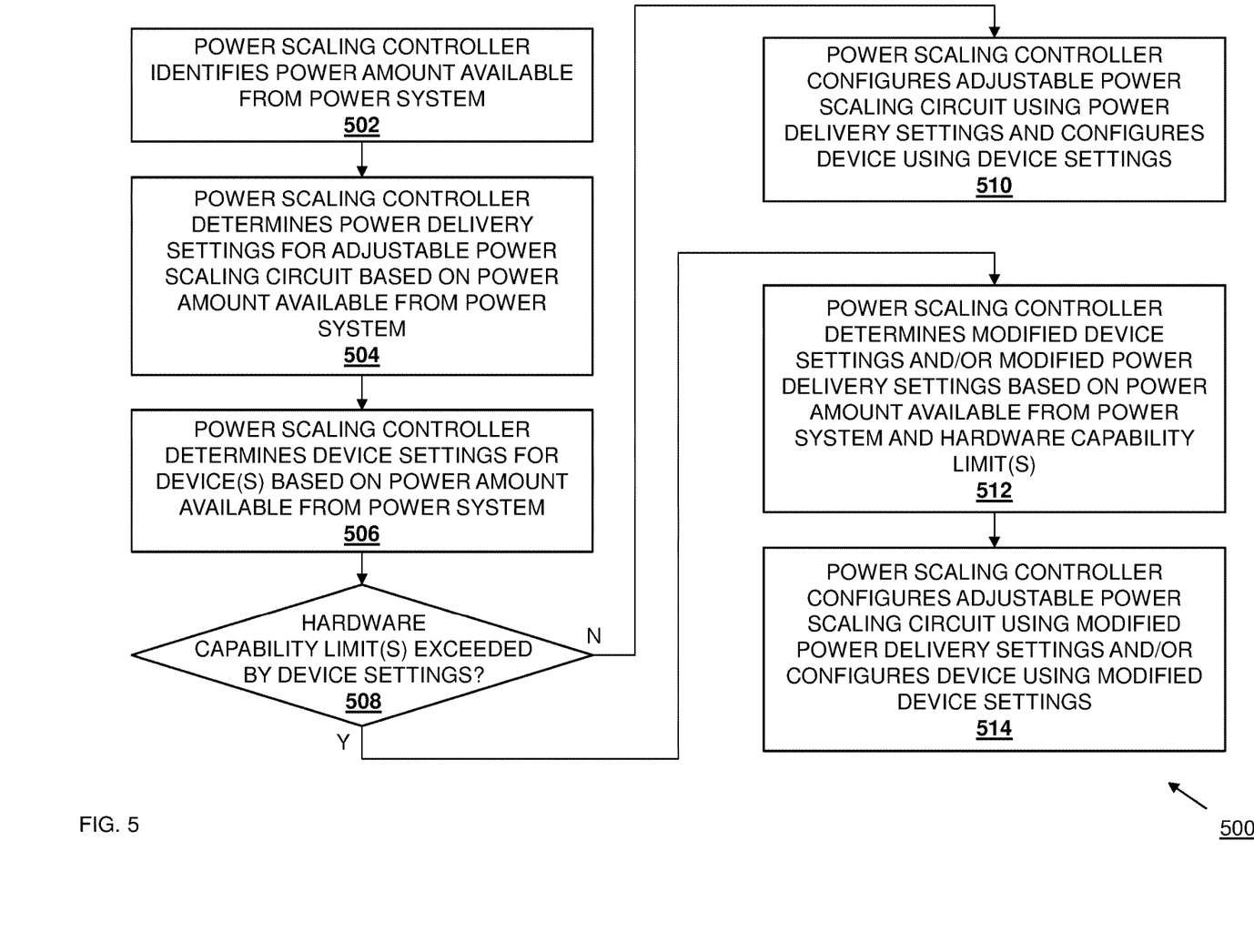
FIG. 5 is a flow chart illustrating an embodiment of a method for configuring power delivery based on available power.

Referring now to FIG. 5, an embodiment of a method 500 for configuring power delivery based on available power is illustrated. As discussed below, the systems and methods of the present disclosure provide for the dynamic configuration of power scaling circuit(s) on a circuit board in a computing device based on characteristics of the power that is available to that computing device in order to allow those power scaling circuit(s) to deliver either the maximum amount of power to their connected device(s) that enables the connected device(s) to operate at their highest available performance level(s), or an amount of power to their connected device(s) that will not overdraw the power system that provides the power to the computing device. For example, the power-availability-based power delivery configuration system includes a power scaling system that is coupled to a device and a power system, and that includes an adjustable power scaling circuit that is configured to convert power received from the power system from a first power level to a second power level. A power scaling controller coupled to the device, the power system, and the power scaling circuit operates to identify a power amount available from the power system in order to determine power delivery settings for the adjustable power scaling circuit, and then configures the adjustable power scaling circuit using the power delivery settings. In some embodiments, the power scaling controller may determine device settings for the device based on the power amount available from the power system, and configure the device using the device settings. As such, the power delivery configuration for the computing device may be dynamically adjusted based on the power rating of the power system, thus providing for the most efficient use of that power system.

Figure 6A:
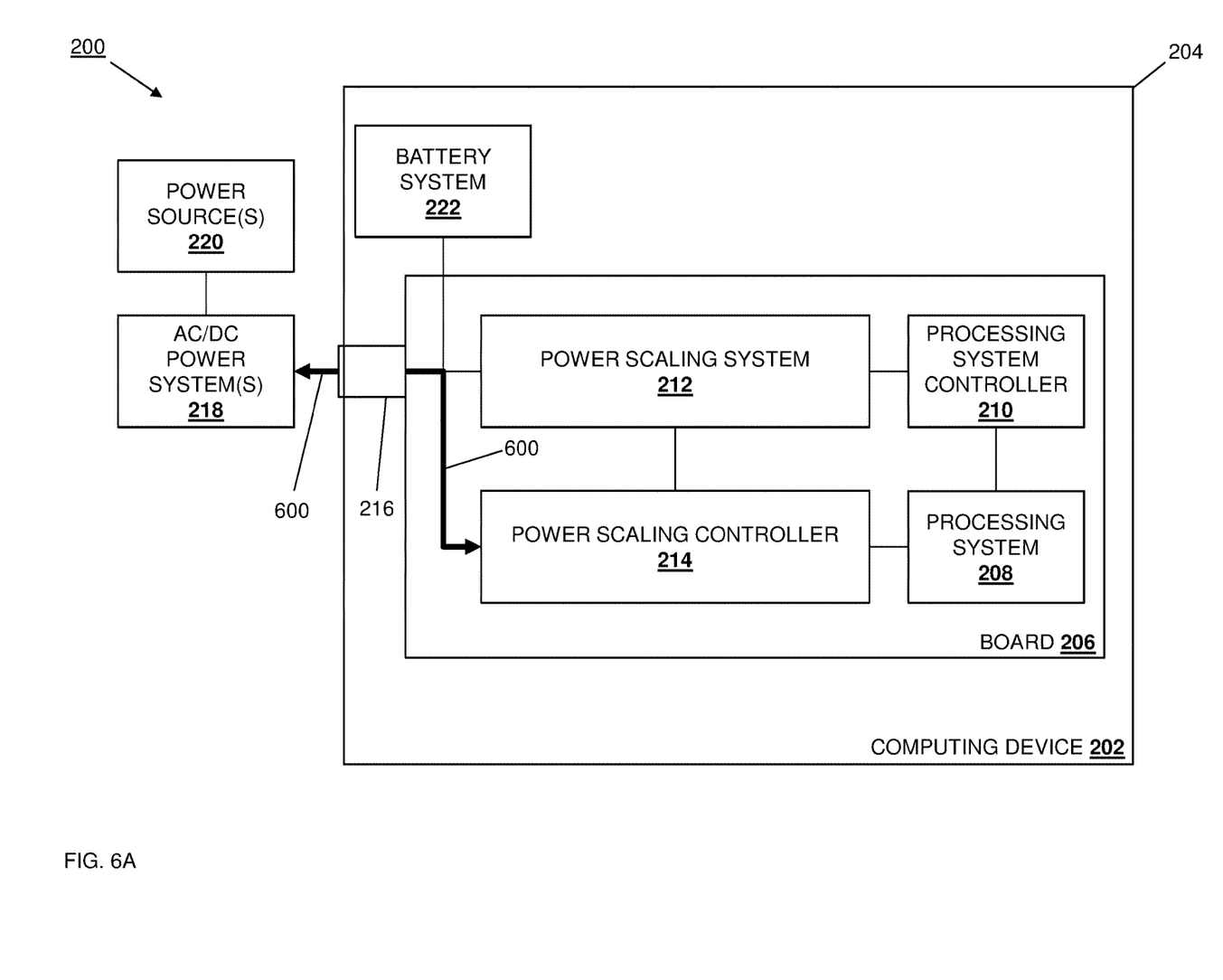
FIG. 6A is a schematic view illustrating an embodiment of the power-availability-based power delivery configuration system of FIG. 2 operating during the method of FIG. 5.

The method 500 begins at block 502 where a power scaling controller identifies a power amount available from a power system. With reference to FIG. 6A, at block 502, the power scaling controller engine 404 in the power scaling controller 214/400 may perform available power identification communications 600 with the AC/DC power system(s) 218 in order to determine a power amount available from the AC/DC power system(s) 218. In some embodiments of block 502, the computing device 202 may be connected to the power source(s) 220 via the AC/DC power system(s) 218 via its power system connector(s) 216, and may be powered on, reset, rebooted, and/or otherwise initialized such that the computing device 202 enters an initialization environment. As discussed above, the power-availability-based power delivery configuration functionality of the present disclosure may be performed by the power scaling controller 214 provided by a BIOS when the computing device is operating in an initialization environment and, as such, at block 502 the power scaling controller engine 404 in the power scaling controller 214/400 may receive (e.g., via its controller communication system 408) power system characteristics from the AC/DC power system(s) 218. For example, one of skill in the art in possession of the present disclosure will recognize how AC/DC power systems (e.g., power adapters, PSUs, etc.) may be configured to report their power system characteristics and/or other power system capabilities to the BIOS during initialization of the computing device 202, and thus how the power scaling controller engine 404 in the power scaling controller 214/400 may receive those power system capabilities and identify a power amount available from the AC/DC power system(s) 218 (e.g., 50 watts, 100 watts, 250 watts, etc.), a voltage available from the AC/DC power system(s) 218, a current available from the AC/DC power system(s) 218, and/or any other power system characteristics or capabilities that would be apparent to one of skill in the art in possession of the present disclosure.

In other embodiments of block 502, the computing device 202 may be connected to the power source(s) 220 via the AC/DC power system(s) 218 via its power system connector(s) 216, and may be operating in a runtime environment (e.g., following the completion of initialization operations in the initialization environment discussed above). As discussed above, the power-availability-based power delivery configuration functionality of the present disclosure may be performed by the power scaling controller 214 provided by an EC when the computing device is operating in a runtime environment and, as such, at block 502 the power scaling controller engine 404 in the power scaling controller 214/400 may receive and/or retrieve (e.g., via its controller communication system 408) power system characteristics from the AC/DC power system(s) 218. For example, while the computing device 202 is in the runtime environment, a first AC/DC power system (e.g., a first power adapter) may be replaced by a second AC/DC power system (e.g., a second power adapter) (i.e., while the computing device 202 operates on power available from the battery system 222), and one of skill in the art in possession of the present disclosure will recognize how power system characteristics and/or other power system capabilities of AC/DC power systems (e.g., power adapters, PSUs, etc.) may be accessible to the EC while the computing device 202 is operating in a runtime environment, and/or how AC/DC power systems may be configured to report their power system characteristics and/or other power system capabilities to the EC during runtime of the computing device 202.

Thus, the power scaling controller engine 404 in the power scaling controller 214/400 may receive or retrieve those power system capabilities and identify a power amount available from the AC/DC power system(s) 218 (e.g., 50 watts, 100 watts, 250 watts, etc.), a voltage available from the AC/DC power system(s) 218, a current available from the AC/DC power system(s) 218, and/or any other power system characteristics or capabilities that would be apparent to one of skill in the art in possession of the present disclosure. However, while two specific examples of the identification of power amounts available from a power system have been described, one of skill in the art in possession of the present disclosure will appreciate that power system characteristics and/or other power system capabilities of a power system may be identified in a variety of manners at block 502 while remaining within the scope of the present disclosure as well. For example, in addition to identifying the power amount available from the AC/DC power system(s) 218, at block 502 the power scaling controller engine 404 in the power scaling controller 214/400 may access power capability information in the battery system 222 to identify a power amount available from the battery system 222. Thus, while the discussion below describes the use of a rated power amount of (e.g., the power amount available from) the AC/DC power system(s) 218, the use of other power system characteristics and/or other power system capabilities to configure power delivery in the computing device is envisioned as falling within the scope of the present disclosure as well.

The method 500 then proceeds to block 504 where the power scaling controller determines power delivery settings for an adjustable power scaling circuit based on the power amount available from the power system. In an embodiment, at block 504, the power scaling controller engine 404 in the power scaling controller 214/400 may utilize the power amount available from the AC/DC power system(s) 218 to determine power delivery settings for the power scaling system 212. In a specific example, the adjustable power scaling circuit 304 in the power scaling system 212/300 may be configured to convert power received from the AC/DC power system(s) 218 at a first power level (e.g., 15-20 volts) to power at a second power level (e.g., 1.2 volts) that is then provided via the processing system controller 210 to the processing system 208. As such, in one embodiment of block 504, the power scaling controller engine 404 in the power scaling controller 214/400 may determine power delivery settings for the adjustable power scaling circuit 304 that allow the adjustable power scaling circuit 304 to provide the power at the second power level (e.g., 1.2 volts) to the processing system 208 when receiving the maximum power amount available from the AC/DC power system(s) 218 (e.g., 100 watts according to the 100 watt power rating of the AC/DC power system(s) 218 identified at block 502).

In a specific example, at block 504, the power scaling controller engine 404 in the power scaling controller 214/400 may determine power delivery settings that include a number of the plurality of resistors 304a-304c that should be "activated" to provide the second power level (e.g., 1.2 volts) of power output by the adjustable power scaling circuit 304 when the adjustable power scaling circuit 304 receives the maximum amount of power available from the AC/DC power system(s) 218 (e.g., 100 watts according to the 100 watt power rating of the AC/DC power system(s) 218 identified at block 502). However, while the determination of the power delivery settings for an adjustable digital resistor device have been described, one of skill in the art in possession of the present disclosure will appreciate how power delivery settings for a variety of adjustable circuits may be determined at block 504 in order to provide the desired power level of the power output by the adjustable power scaling circuit of the present disclosure when receiving the maximum power amount available from the AC/DC power system(s) while remaining within the scope of the present disclosure as well. For example, in some embodiments, the power amount available from the battery system 222 may be used along with the power available from the AC/DC power system(s) 218 in order to determine the power delivery settings at block 504.

The method 500 then proceeds to block 506 where the power scaling controller determines device settings for device(s) based on the power amount available from the power system. In an embodiment, at block 506, the power scaling controller engine 404 in the power scaling controller 214/400 may determine processing system settings for the processing system 208 based on the maximum amount of power available from the AC/DC power system(s) 218 (e.g., 100 watts according to the 100 watt power rating of the AC/DC power system(s) 218 identified at block 502). For example, one of skill in the art in possession of the present disclosure will appreciate how the processing system 206 (e.g., a CPU) may be configurable with a variety of processing system settings including processing system "turbo" mode settings, processing system hardware Performance-state (P-state) settings, and/or any other processing system settings known in the art, and the ability to perform operations associated with those processing system settings may require particular amounts of power. As such, based on the power amount available from the AC/DC power system(s) 218, processing system functionality may be enabled or disabled at block 506 using the processing system settings that are appropriate for the power amount available from the AC/DC power system(s) 218 such that all processing system functionality available based on that power amount are enabled, while processing system functionality that requires more power than is available from the AC/DC power system(s) 218 is not enabled.

Thus, one of skill in the art in possession of the present disclosure will appreciate how the processing system settings determined at block 506 may enable relatively higher performance/power requirement processing system functionality (e.g., a processing system "turbo" mode) when the maximum power amount available from the AC/DC power system(s) 218 is relatively high, and may disable relatively higher performance/power requirement processing system functionality (e.g., a processing system "turbo" mode) when the maximum power amount available from the AC/DC power system(s) 218 is relatively low. However, while a specific example of the determination of processing system settings for a processing system are described herein, one of skill in the art in possession of the present disclosure will recognize how device settings for any device may be determined based on the power amount available to the computing device 202 while remaining within the scope of the present disclosure as well. For example, in some embodiments, the power amount available from the battery system 222 may be used along with the power available from the AC/DC power system(s) 218 in order to determine the device settings at block 506.

The method 500 then proceeds to decision block 508 where it is determined whether one or more hardware capability limits are exceeded by the device settings. In an embodiment, at decision block 508, the power scaling controller engine 404 in the power scaling controller 214/400 may determine whether the device settings determined at block 506 may provide for device operation that exceeds any hardware capability limits of hardware components in the computing device 202. For example, one of skill in the art in possession of the present disclosure will recognize how the computing device 202 may include voltage regulators (e.g., included in the processing system 208), thermal components, circuit board input etches, other circuit board components, and/or other hardware subsystems that may be associated with operating limits and/or other hardware capability limits that may be exceeded when the processing system 208 operates according to the processing system settings determined at block 506, and thus at decision block 508 the power scaling controller engine 404 in the power scaling controller 214/400 may utilize a variety of techniques known in the art to determine whether the processing system settings determined for the processing system 208 at block 506 (e.g., that enable the processing system "turbo" mode) will cause the processing system 208 to operate in a manner that exceeds the hardware capability limits of any hardware components in the computing device 202. Similarly as discussed above, while the determination of whether hardware capability limits are exceeded based on processing system operation is described, the determination of whether hardware capability limits are exceeded based on any device operation for which device settings were determined at block 506 will fall within the scope of the present disclosure as well.

Figure 6B:
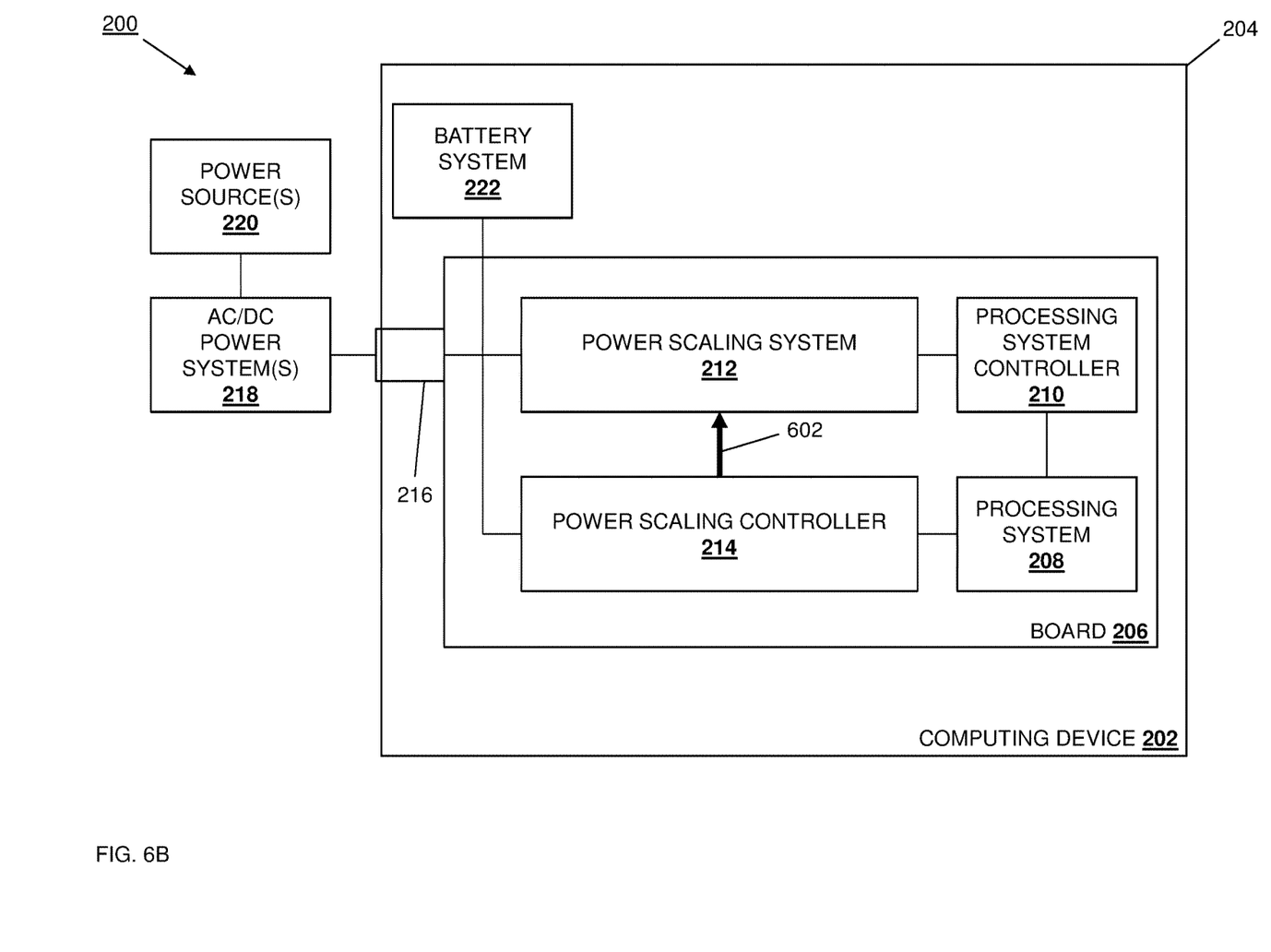
FIG. 6B is a schematic view illustrating an embodiment of the power-availability-based power delivery configuration system of FIG. 2 operating during the method of FIG. 5.
Figure 6C:
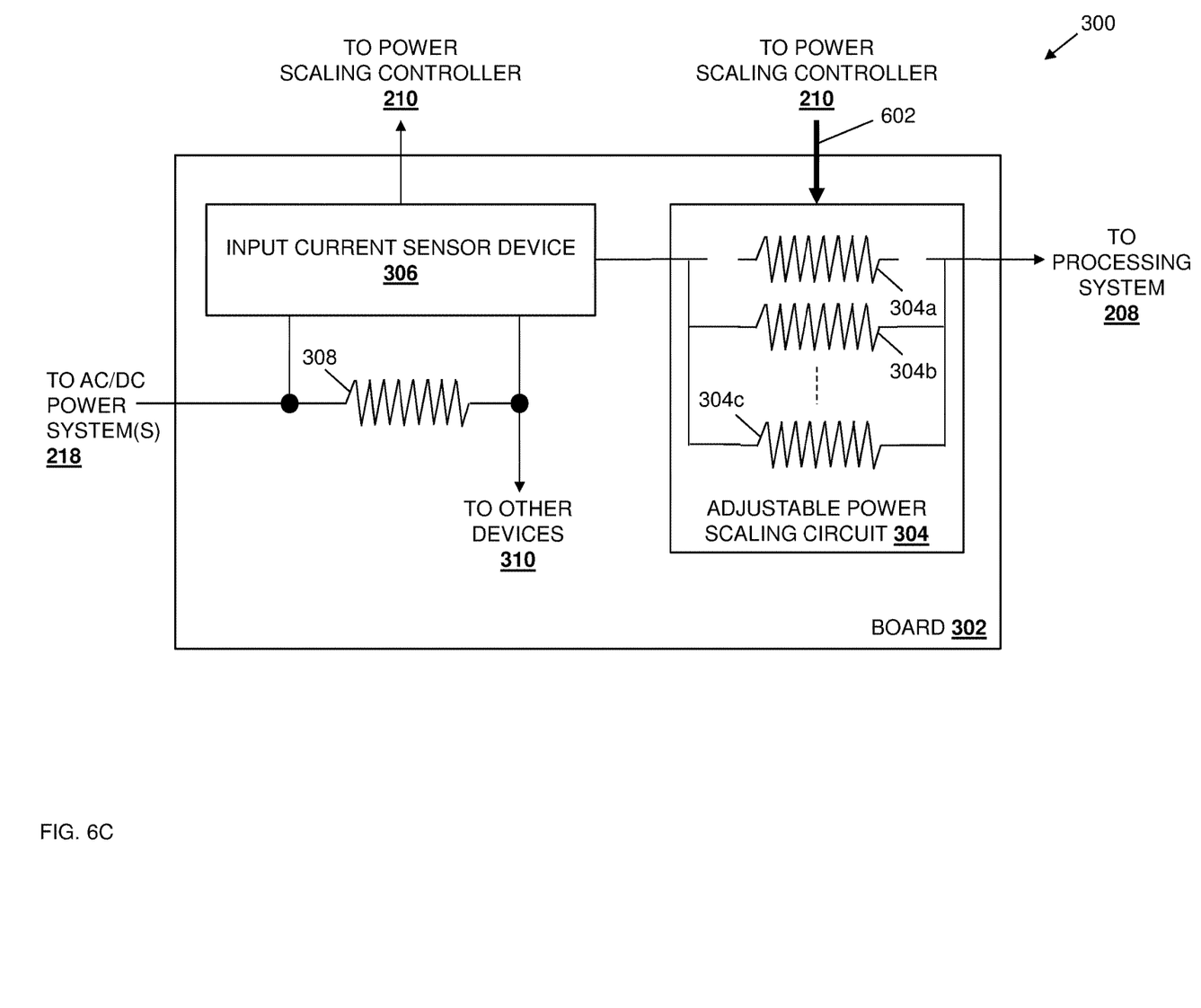
FIG. 6C is a schematic view illustrating an embodiment of the power scaling controller of FIG. 4 operating during the method of FIG. 5.
Figure 6D:
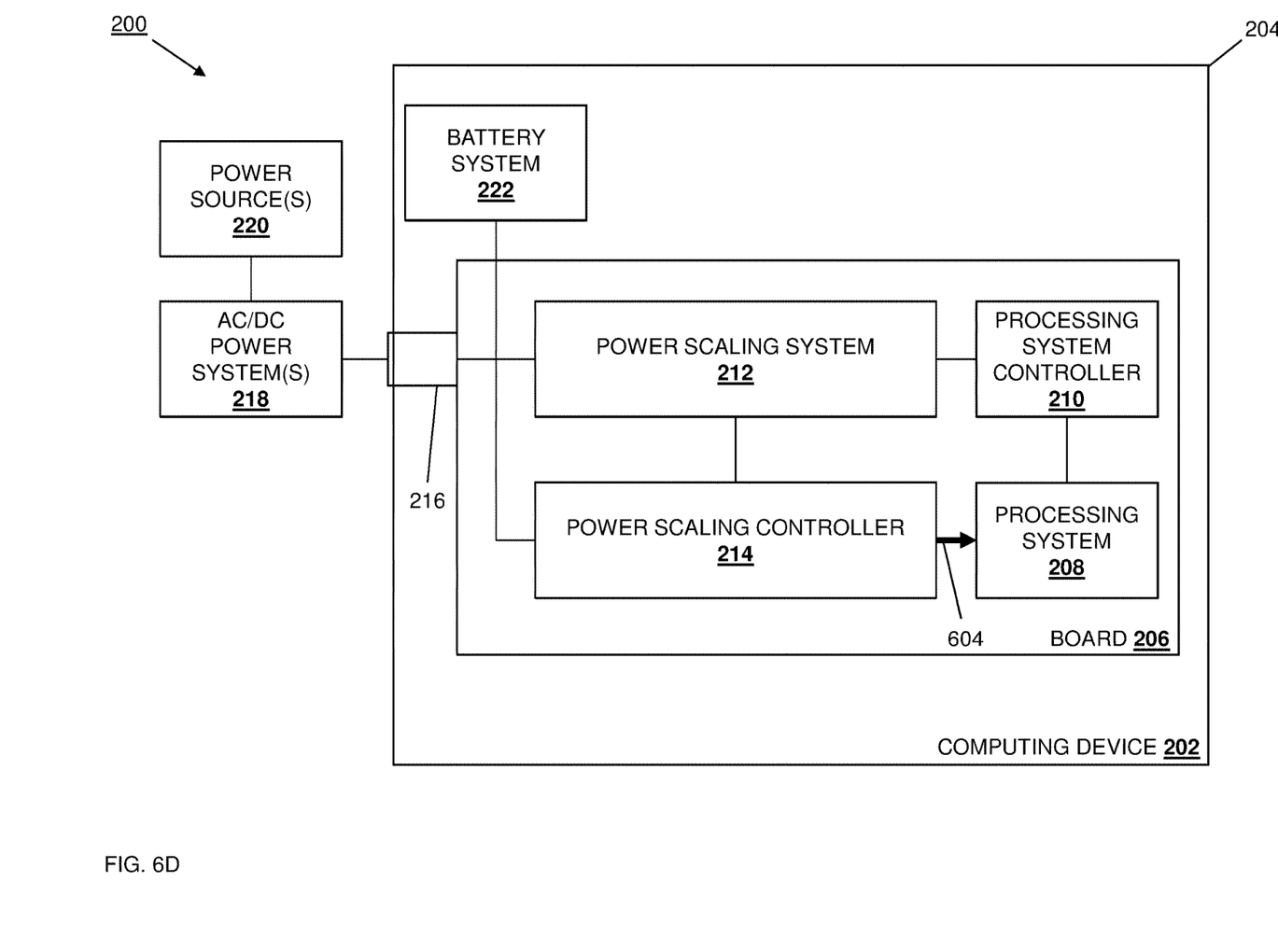
FIG. 6D is a schematic view illustrating an embodiment of the power-availability-based power delivery configuration system of FIG. 2 operating during the method of FIG. 5.

If, at decision block 508, it is determined that no hardware capability limits are exceeded by the device settings, the method 500 proceeds to block 510 where the power scaling controller configures the adjustable power scaling circuit using the power delivery settings and configures the device using the device settings. As illustrated in FIGS. 6B, 6C, and 6D, in an embodiment of block 510 and in response to determining that the no hardware capability limits are exceeded by the processing system settings determined at block 506, the power scaling controller engine 404 in the power scaling controller 214/400 may perform power scaling system configuration operations 602 in order to configure the adjustable power scaling circuit 304 in the power scaling system 212/300 using the power delivery settings, and may perform processing system configuration operations 604 in order to configure the processing system 208 using the processing system settings.

For example, with reference to FIGS. 6B and 6C, the power scaling system configuration operations 602 may include "activating" one or more of the resistor elements 304a-304c in the adjustable power scaling circuit 304, with the specific example illustrated in FIG. 6C "activating" the resistor elements 304b and 304c by connecting them to the power received via the input current sensor device 306, and coupling them to the processing system 208 (via respective connections to the processing system controller 210). As will be appreciated by one of skill in the art in possession of the present disclosure, the "activation" of the resistor elements 304a-304c may include the activation of a number of those resistor elements 304a-304c that cause the adjustable power scaling circuit 304 to receive the maximum amount of power available from the AC/DC power system(s) 218 (e.g., 100 watts) and provide power at the second power level (e.g., 1.2 volts) to the processing system 208. As such, in this specific example, different numbers of resistor elements 304a-304c may be "activated" based on different maximum power amounts being available from AC/DC power system(s) (e.g., a first number of the resistor elements 304a-304c may be "activated" for an AC/DC power adapter or PSU that is rated at 50 watts in order to make the adjustable power scaling circuit 304 provide power at the second power level (e.g., 1.2 volts), while a second (higher) number of the resistor elements 304a-304c may be "activated" for an AC/DC power adapter or PSU that is rated at 100 watts in order to make the adjustable power scaling circuit 304 provide power at the second power level (e.g., 1.2 volts), and so on.)

Thus, in some embodiments, the resistance of the adjustable digital resistor device in the adjustable power scaling circuit may be "matched" to the AC/DC power system(s). In a specific example, voltage scaling may be enabled by a minimum of 8-bits of data, thus providing for at least 255 voltage scaling set points for the adjustable power scaling circuit 304 (e.g., that may be used to convert the power received from the AC/DC power system(s) 218 to the second power level (e.g., 1.2 volts)). However, as discussed above, while the "activation" of resistor elements in an adjustable digital resistor device has been described, one of skill in the art in possession of the present disclosure will appreciate how different adjustable circuits may be adjusted in different manners at block 510 in order to provide the desired power level of the power output by the adjustable power scaling circuit of the present disclosure when receiving the maximum power amount available from the AC/DC power system(s) while remaining within the scope of the present disclosure as well. For example, in some embodiments, the power amount available from the battery system 222 may be used along with the power available from the AC/DC power system(s) 218 in order to configure the adjustable power scaling circuit 304 at block 510.

Similarly, with reference to FIG. 6D, the processing system configuration operations 604 may include the power scaling controller engine 404 in the power scaling controller 214/400 enabling or disabling a processing system "turbo" mode in the processing system, enabling or disabling one or more processing system hardware P-states, and/or performing any other processing system configuration operations according to the processing system settings determined at block 506. As discussed above, while the configuration of a processing system is described, one of skill in the art in possession of the present disclosure will appreciate that any device receiving power from the adjustable power scaling circuit 304 in the power scaling system 212/300 may be configured according to device settings determined at block 506 while remaining within the scope of the present disclosure as well. Thus, following block 510, the processing system 208 may operate based on the processing system settings using power provided by the AC/DC power system(s) 218 and converted by the power scaling system 212 based on the maximum power available from the AC/DC power system(s) 218.

If at decision block 506, it is determined that hardware capability limits are exceeded by the device settings, the method 500 proceeds to block 512 where the power scaling controller determines modified device settings and/or modified power delivery settings based on the power amount available from the power system and the hardware capability limit(s). In an embodiment, at block 512, the power scaling controller engine 404 in the power scaling controller 214/400 may determine modified processing system settings for the processing system 208 and/or modified power delivery settings for the power scaling system 212 based on the maximum amount of power available from the AC/DC power system(s) 218 (e.g., 100 watts according to the 100 watt power rating of the AC/DC power system(s) 218 identified at block 502) and the hardware capability limit(s) of the hardware components in the computing device 202. Similarly as discussed above, the power scaling controller engine 404 in the power scaling controller 214/400 may identify configuration(s) of the adjustable power scaling circuit 304 in the power scaling system 212/300 and/or processing system functionality of the processing system 208 that should be enabled/disabled at block 512 based on the power amount available from the AC/DC power system(s) 218 and the hardware capability limit(s) of the hardware components in the computing device 202 in order to determine the modified power delivery settings and/or modified processing system settings that are appropriate for the power amount available from the AC/DC power system(s) 218 and the hardware capability limits of the hardware components in the computing device 202 such that all processing system functionality available based on that power amount are enabled while not exceeding those hardware capability limit(s), while processing system functionality that exceeds those hardware capability limit(s) is not enabled. In some embodiments, the power amount available from the battery system 222 may be used along with the power available from the AC/DC power system(s) 218 in order to determine the modified power delivery settings and the modified device settings at block 512.

The method 500 then proceeds to block 514 where the power scaling controller configures the adjustable power scaling circuit using the modified power delivery settings and/or configures the device using the modified device settings. Similarly as discussed above with reference to FIGS. 6B, 6C, and 6D, in an embodiment of block 514 and in response to determining the modified power delivery settings and/or modified processing system settings at block 512, the power scaling controller engine 404 in the power scaling controller 214/400 may perform the power scaling system configuration operations 602 in order to configure the adjustable power scaling circuit 304 in the power scaling system 212/300 using the modified power delivery settings, and/or may perform processing system configuration operations 604 in order to configure the processing system 208 using the modified processing system settings. As will be appreciated by one of skill in the art in possession of the present disclosure, the power scaling controller 214 may modify either or both configurations of the power scaling system 212 and the processing system 208 in order to address the hardware capability limit(s) discussed above by, for example, only configuring the adjustable power scaling circuit 304 up to the hardware capability limit(s) of the hardware components in the computing device 202. As such, the adjustable power scaling circuit 304 in the power scaling system 212/300 and the processing system 208 may be configured at block 514 to utilize power available from the AC/DC power system(s) 218 (and in some embodiments, the battery system 222) to provide processing system functionality up to the hardware capability limits of the hardware components in the computing device 202. Thus, following block 514, the processing system 208 may operate based on the modified processing system settings using power provided by the AC/DC power system(s) 218 and converted by the power scaling system 212 based on the maximum power available from the AC/DC power system(s) 218 and the hardware capability limits of the hardware components in the computing device 202.

Thus, systems and methods have been described that provide for the dynamic configuration of power scaling circuit(s) on a circuit board in a computing device based on characteristics of the power that is available to that computing device in order to allow those power scaling circuit(s) to deliver either the maximum amount of power to their connected device that enables that connected device to operate at its highest available performance level, or an amount of power to their connected device that will not overdraw the power system that provides the power to the computing device. For example, the power-availability-based power delivery configuration system includes a power scaling system that is coupled to a device and a power system, and that includes an adjustable power scaling circuit that is configured to convert power received from the power system from a first power level to a second power level. A power scaling controller coupled to the device, the power system, and the power scaling circuit operates to identify a power amount available from the power system in order to determine power delivery settings for the adjustable power scaling circuit, and then configures the adjustable power scaling circuit using the power delivery settings. In some embodiments, the power scaling controller may determine device settings for the device based on the power amount available from the power system, and configure the device using the device settings. As such, the power delivery configuration for the computing device may be dynamically adjusted based on the power rating of the power system, thus providing for the most efficient use of that power system.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A power-availability-based power delivery configuration system, comprising:
    a device;
    a power scaling system that is coupled to the device and a power system, wherein the power scaling system includes an adjustable power scaling circuit that is configured to convert power received from the power system from a first power level to a second power level; and
    a power scaling controller that is coupled to the device, the power system, and the power scaling circuit, wherein the power scaling controller is configured to:
        identify a power rating for the power system;
        determine, based on the power rating for the power system, power delivery settings for the adjustable power scaling circuit and device settings for the device;
        configure, using the power delivery settings, the adjustable power scaling circuit; and
        configure, using the device settings, the device.

2. The system of claim 1, wherein the device settings enable the device to operate at a performance level that does not draw most power that is available at the second power level.

3. The system of claim 1, wherein the power scaling controller is configured to:
determine at least one hardware capability limit; and
determine, based on the power rating for the power system and the at least one hardware capability limit, the device settings for the device.

4. The system of claim 1, wherein the power rating for the power system identifies a maximum power amount available from the power system, wherein the power delivery settings allow the adjustable power circuit to convert the maximum power amount received from the power system to the second power level, and wherein the device settings enable the device to operate at a highest performance level available for the second power level.

5. The system of claim 1, wherein the adjustable power scaling circuit includes at least one adjustable resistor device that is configured to convert power received from the power system from a first power level to a second power level.

6. The system of claim 1, wherein the device is a processing system.

7. An Information Handling System (IHS), comprising:
a controller processing system; and
a controller memory system that is coupled to the controller processing system and that includes instructions that, when executed by the controller processing system, cause the controller processing system to provide a power scaling controller engine that is configured to:
identify a power rating for a power system;
determine, based on the power rating for the power system, power delivery settings for an adjustable power scaling circuit that is coupled to the power system and configured to convert power received from the power system from a first power level to a second power level, and device settings for a device that is coupled to the adjustable power scaling circuit;
configure, using the power delivery settings, the adjustable power scaling circuit; and
configure, using the device settings, the device.

8. The IHS of claim 7, wherein the device settings enable the device to operate at a performance level that does not draw most power that is available at the second power level.

9. The IHS of claim 7, wherein the power scaling controller engine is configured to:
determine at least one hardware capability limit; and
determine, based on the power rating for the power system and the at least one hardware capability limit, the device settings for the device.

10. The IHS of claim 7, wherein the power rating for the power system identifies a maximum power amount available from the power system, wherein the power delivery settings allow the adjustable power circuit to convert the maximum power amount received from the power system to the second power level, and wherein the device settings enable the device to operate at a highest performance level available for the second power level.

11. The IHS of claim 7, wherein the adjustable power scaling circuit includes at least one adjustable resistor device that is configured to convert power received from the power system from a first power level to a second power level.

12. The IHS of claim 7, wherein the controller processing system is a Basic Input/Output System (BIOS) processing system that operates in an initialization environment.

13. The IHS of claim 7, wherein the controller processing system is an Embedded Controller (EC) processing system that operates in a runtime environment.

14. A method for configuring power delivery based on power availability, comprising:
identifying, by a power scaling controller, a power rating for a power system;
determining, by the power scaling controller based on the power rating for the power system, power delivery settings for an adjustable power scaling circuit that is coupled to the power system and is configured to convert power received from the power system from a first power level to a second power level, and device settings for a device that is coupled to the adjustable power scaling circuit;
configuring, by the power scaling controller using the power delivery settings, the adjustable power scaling circuit; and
configuring, using the device settings, the device.

15. The method of claim 14, wherein the device settings enable the device to operate at a performance level that does not draw most power that is available at the second power level.

16. The method of claim 15, further comprising:
determining, by the power scaling controller, at least one hardware capability limit; and
determine, by the power scaling controller based on the power rating for the power system and the at least one hardware capability limit, the device settings for the device.

17. The method of claim 14, wherein the power rating for the power system identifies a maximum power amount available from the power system, wherein the power delivery settings allow the adjustable power circuit to convert the maximum power amount received from the power system to the second power level, and wherein the device settings enable the device to operate at a highest performance level available for the second power level.

18. The method of claim 14, wherein the adjustable power scaling circuit includes at least one adjustable resistor device that is configured to convert power received from the power system from a first power level to a second power level.

19. The method of claim 14, wherein the power scaling controller is included in a Basic Input/Output System (BIOS) and operates in an initialization environment.

20. The method of claim 14, wherein the power scaling controller is included in an Embedded Controller (EC) and operates in a runtime environment.

* * * * *